Patented Aug. 13, 1929.

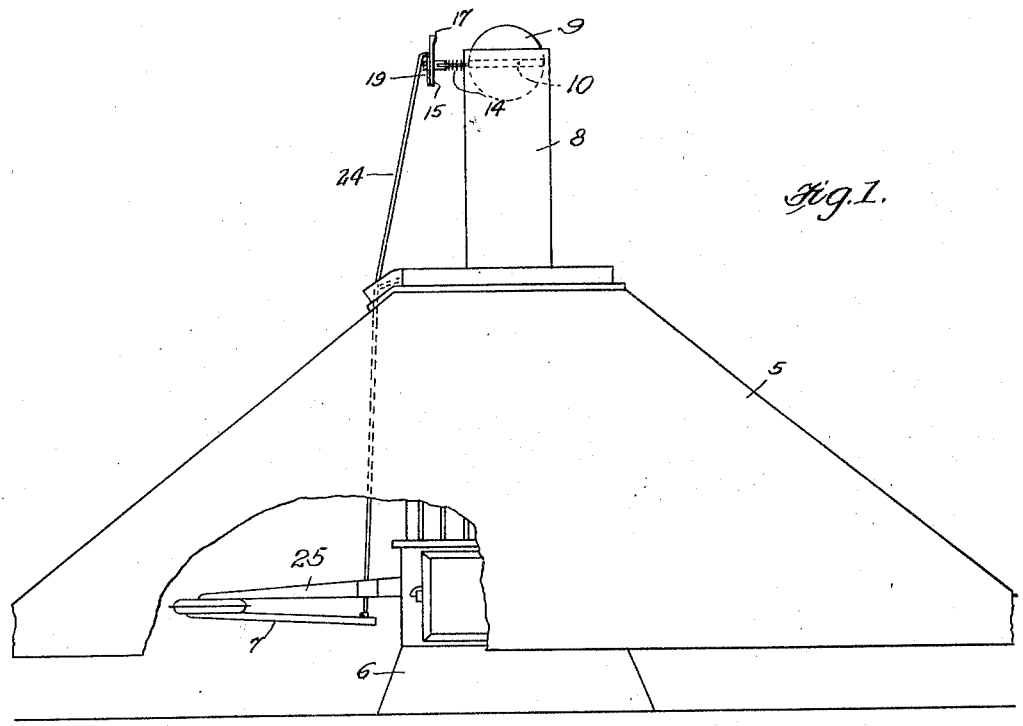
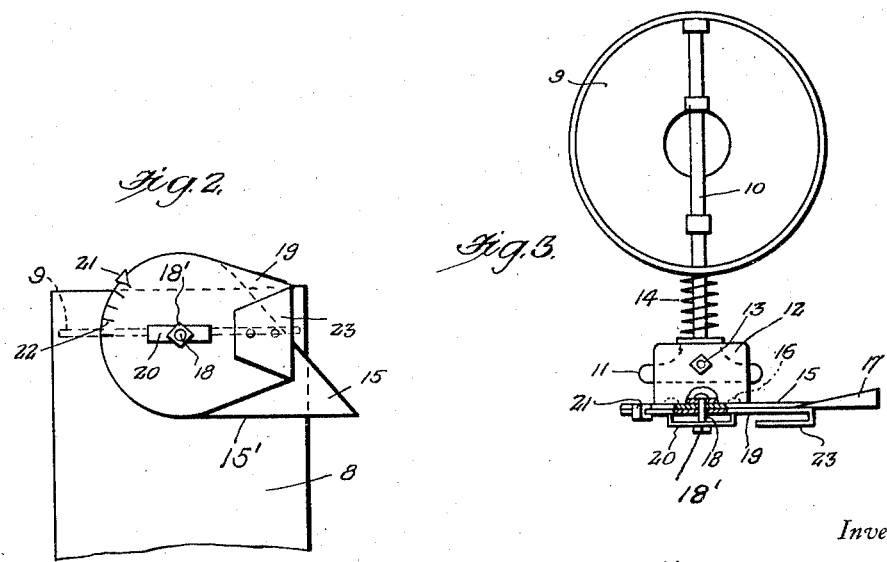
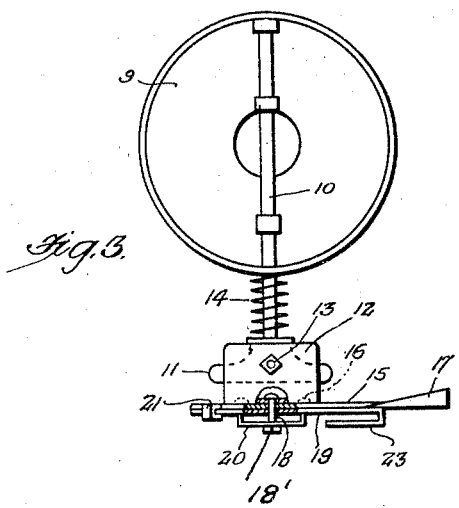

1,724,061

UNITED STATES PATENT OFFICE.

RAYMOND C. ZIMMERMAN, OF LIMA, OHIO.

DAMPER CONTROL FOR BROODER STOVES.

Application filed June 17, 1927. Serial No. 199,519.

My invention relates to attachments for brooder stoves and has for its principal object to provide a damper located in the stove pipe of the brooder stove and operatively attached to the usual stove damper control lever whereby to regulate the movement of the pipe damper in accordance with the movement of the stove damper.

A further object of the invention is to provide an attachment of this character by means of which an even and uniform temperature is maintained within the brooder house.

Other objects and advantages of the invention will become apparent during the course of the following detailed description.

In the drawings:

Figure 1 is a view in elevation of a brooder stove with my invention operatively attached thereto.

Figure 2 is a detail of the pipe damper position indicating plate, and,

Figure 3 is a plan view showing the pipe damper in assembled position.

Referring now to the drawing, I have disclosed my invention for use in connection with a brooder stove having a hover 5, within which is arranged a stove 6, and at one side of which is disposed a draft control lever 7. A stove pipe 8 extends upwardly from the stove through the hover 5 and near its upper end is pivotally arranged a pipe damper 9, adapted to open or close the opening in the pipe.

The pipe damper is carried on a shaft 10 extending laterally from the pipe and is provided at its outer end with a flattened head 11, secured in a substantially U-shaped bracket 12, by means of a bolt and nut 13. A coil spring 14 is mounted on the damper shaft, with its opposite ends abutting the bracket and the pipe respectively to tensionally hold the valve against idle swinging movement.

The bracket 12 is disposed horizontally and is secured to a plate 15, by means of rivets 16 or the like, one end of the plate being formed into a handle 17. The plate and pipe damper are thus secured for movement as a unit. A pin 18 extends outwardly from the bracket 12, and is disposed in axial alignment with the shaft 10. A plate 19 is rotatably supported on the pin 18 in parallel relation with the plate 15. A U-shaped bracket 20 is also mounted on the outer end of the pin with its ends extended inwardly against the outer surface of the plate 19 and is retained in position by a nut 18' threaded on the pin whereby to provide a means for securing the plate 19 in frictional gripping engagement with the plate 15 for movement as a unit, when desired, through the tightening of the nut.

The plates 15 and 19 are substantially coextensive with one edge of the plates rounded, and with an indicating finger 21 formed on the inner plate 15, and bent outwardly and over the edge of the outer plate 19, said finger being registerable with a scale 22 formed on the rounded edge of the outer plate.

The edge of the plate 15 opposite from the rounded edge is formed with a straight edge 15' tangentially disposed with respect to the axis of the shaft 10 and parallel with the edge of the valve 9, as more clearly illustrated in Figure 2 of the drawing. Thus, the angle at which the straight edge 15' is disposed will indicate the position of the valve in the pipes.

The side of the plate 19, opposite from the rounded edge is bent inwardly upon itself to form an attaching member 23 for a rod 24 connecting the plate with the lever 7. The lever 7 is operatively connected with the arm 25 of a stove damper of conventional construction (not shown), such as is usually provided for controlling the draft of the stove, the stove damper and the pipe damper, thus being operatively connected, so that the movement of the former will result in a similar movement of the latter.

Should it be desired to adjust the pipe damper so as to maintain the valve 9 in a slightly open position while the stove damper is completely closed, the necessary adjustments may be made by loosening the nut 18' and turning the plate 15 a desired extent, the indicating finger 21 and scale 22 cooperating to indicate the extent to which the plate has been adjusted.

It is a common practice to employ the use of a thermostat for operating the stove damper and since my invention is operatively connected with the stove damper the same therefore will be controlled by the thermostat although arranged to operate with the movement of the stove damper.

It is obvious from the foregoing description that various changes in the size, shape and arrangement of parts may be resorted to, without departing from the spirit of the invention or the scope of the appended claims.

I claim:

1. A heat controlling device for brooder stoves comprising a stove having a stove damper and a pipe damper, said pipe damper having a shaft extending laterally from the pipe, a bracket attached to said shaft, a plate attached to the bracket, a plate disposed parallel with said first named plate and adapted for attachment thereto in adjusted position, a bolt extending through said plates in axial alignment with said shaft and adapted to frictionally secure the plates for movement as a unit, one of said plates having a straight edge formed thereon tangentially with respect to the shaft for indicating the position of the damper associated with said shaft, and means connecting the other of said plates with the stove damper whereby to provide for the simultaneous operation thereof.

2. A heat regulator for stoves comprising a stove damper operating lever, and a damper arranged in the pipe of the stove, said damper having a shaft extending laterally therefrom, a plate member, means for securing said plate member to said shaft, a plate member adjustably carried by said first named plate member, means for frictionally securing said plate members for movement as a unit, and means for connecting said last named plate member with the stove damper operating lever for actuation thereby.

In testimony whereof I affix my signature.

RAYMOND C. ZIMMERMAN.